C. R. Bellows.
Rope Mach.

N° 26,872. Patented Jan. 17, 1860.

N. PETERS, PHOTO-LITHOGRAPHER, WASHINGTON, D. C.

UNITED STATES PATENT OFFICE.

C. R. BELLOWS, OF SENECA FALLS, NEW YORK, ASSIGNOR TO HIMSELF AND D. B. LUM; SAID LUM ASSIGNOR TO ABRAHAM ORVIS, OF NIAGARA CITY, NEW YORK.

IMPROVEMENT IN ROPE-MAKING MACHINES.

Specification forming part of Letters Patent No. 26,872, dated January 17, 1860.

*To all whom it may concern:*

Be it known that I, C. R. BELLOWS, of Seneca Falls, in the county of Seneca and State of New York, have invented a new and useful Improvement in Rope-Making Machinery; and I do hereby declare that the following is a full, clear, and exact description of the same, reference being had to the accompanying drawings, forming part of this specification, in which—

Figure 1:
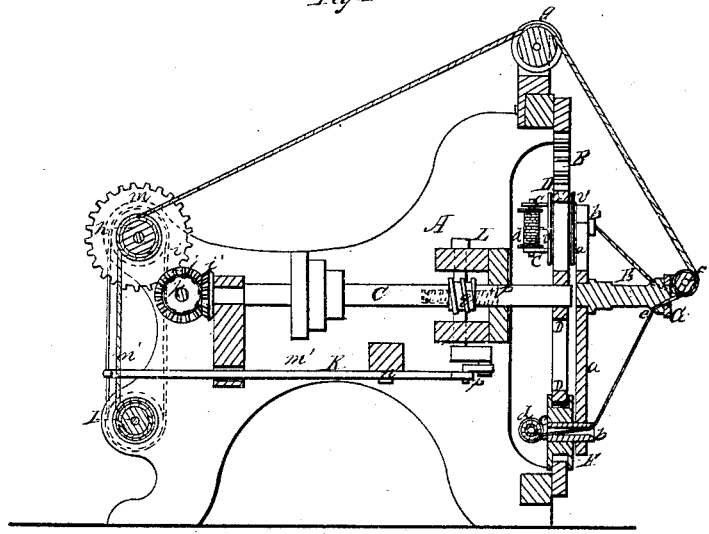
Figure 3:
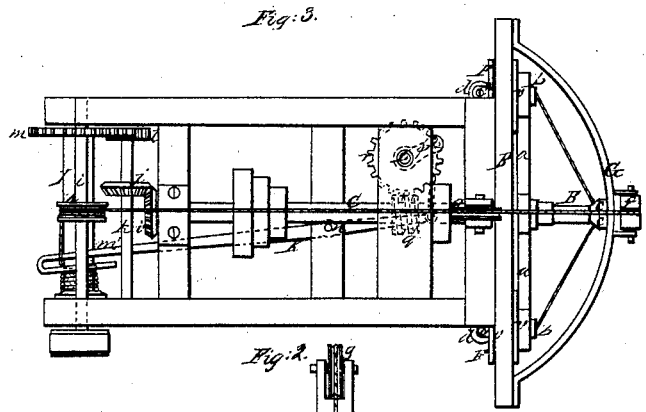
Figure 2:
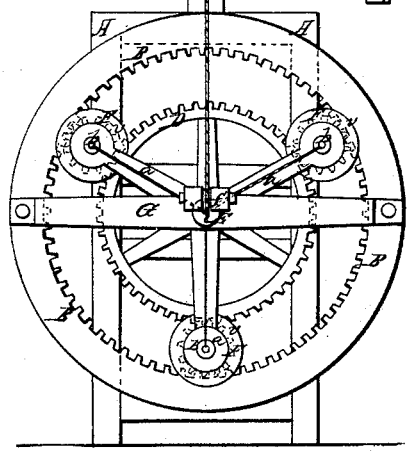

Figure 1 is a longitudinal central section of a rope-machine with my improvement. Fig. 2 is a front elevation of the same. Fig. 3 is a plan of the same.

Similar letters of reference indicate corresponding parts in the several figures.

To enable others skilled in the art to make and use my invention, I will proceed to describe its construction and operation.

A represents the framing of the machine, to one end of which is securely bolted a large upright internally-toothed ring B.

C is the main shaft of the machine, to which motion is imparted to drive all its parts through any suitable agency, said shaft being fitted to rotate in suitable bearings on the frame A, such bearings being so arranged that the axis of the said shaft is the same as the axis of the stationary toothed ring B.

D is a spur-gear of the same pitch and breadth of cog as the ring B, and secured to one extremity of the shaft C, which is arranged in such position longitudinally that the said gear D will rotate within the ring B.

E is the laying-spindle arranged in line with and nearly close to the shaft C, but on the opposite side of the ring B, and having but one fixed bearing—viz., at the end farthest from the ring B, which end has a journal formed upon it to fit to a bearing in a strong bow-shaped bracket or frame G, secured to the ring.

At that end of the laying-spindle next the shaft C and ring B there are secured three or more arms $a\ a\ a$, according to the number of strands in the rope to be made, each of which arms contains a bearing for one of the strand-fliers. The strand-fliers consist each of a short hollow spindle $b$, carrying a pinion F of such size as to gear with the stationary ring B and large gear D, and two plates $c\ c$ at the back of the pinion, which plates contain the bearings for the strand-bobbin $d$, said pinion $b$ being provided with flanges $v\ v$ on both sides to keep it in place between the large gear and stationary ring.

The laying-spindle E contains the ordinary arrangement of holes $e\ e$ for conducting the strands from the fliers to the laying-point at the extremity of the said spindle, and a pulley $f$ is attached to the extremity of the bracket G to conduct the rope from the laying-spindle to a second pulley $g$ on the top of the framing, which latter conducts it to a pulley $h$ on a shaft $i$ at the rear end of the machine, said pulley $h$ having the rope wound once completely round it, and having a positive motion imparted to it from the main shaft C by means of a bevel-gear $i'$ on the said shaft gearing with a bevel-wheel $j$ on a shaft $k$, on which there is a pinion $l$, which gears with a gear $m$ on the shaft $i$. The rope is conducted by a traversing guide $m'$ from the pulley $h$ to a large take-up spool I, which is driven by a belt from the shaft $i$ of the pulley $h$; but this belt is only just tight enough to carry round the spool, so that it will slip, as required, by the varying circumference of the quantity of rope on the spool. The traversing guide $m$ is attached to or forms part of a horizontal lever K of the first order, which works on a fulcrum $n$ and derives motion from a crank $p$ on the lower end of an upright shaft L, which derives a slow motion from the main shaft C through an endless screw $q$ and worm-wheel $r$.

The operation of the machine is as follows: The strands having been conducted from their bobbins $d\ d$ through the flier-spindles $b$ and guides $e\ e$, and from thence over the pulleys $g$ and $h$ to the take-up spool I, the main shaft C may be set in motion and the rotation of the large gear D will cause the pinions F F to roll round the ring B, and in so doing will cause them and the fliers to which they are attached to rotate on their own axes as well as around the axis of the laying-spindle in the proper relative directions to form the strands into rope, and at relative velocities depending on the relative sizes of the ring B, gear D, and pinions F F. This mode of applying and driving the fliers simplifies the construction of the fliers themselves, and of all that part of the machine which carries them, and insures their proper relative motions.

The arrangement, considered as a whole, greatly reduces the size of the machine and admits of cordage being made in a very small compass. The motive power is applied at the periphery of the fliers instead of at the axis, and thus but half the power at most is required to twist the strands. The gearing being positive and not depending upon friction, together with the above gain of leverage, adapts the machine to the manufacture of wire cordage. It affords facility to get at every part of the machine, more especially the fliers, for the purpose of removing and reinstating the spool or caps, and also for "oiling up."

What I claim as my invention, and desire to secure by Letters Patent, is—

The arrangement of the internally-toothed rack B, spur-wheel D, driving-shaft C, flying-spindle E, toothed flanged fliers F, and bobbins d, in combination with and in the relation specified to the other described mechanism which controls the cord or rope after it is made, substantially as and for the purpose set forth.

C. R. BELLOWS.

Witnesses:
 MARK HEATH,
 GEORGE COLEMEN.